June 18, 1963  L. R. HEIM  3,093,884
APPARATUS FOR BURNISHING TELESCOPED BEARINGS
Filed June 16, 1959  2 Sheets-Sheet 1

INVENTOR.
LEWIS R. HEIM
BY Davis, Hoxie, Faithfull
and Hapgood
ATTORNEYS

June 18, 1963 L. R. HEIM 3,093,884
APPARATUS FOR BURNISHING TELESCOPED BEARINGS
Filed June 16, 1959 2 Sheets-Sheet 2

INVENTOR.
LEWIS R. HEIM
BY Davis, Hoxie, Faithfull
& Hapgood
ATTORNEYS

United States Patent Office 3,093,884
Patented June 18, 1963

3,093,884
APPARATUS FOR BURNISHING TELESCOPED BEARINGS
Lewis R. Heim, Fairfield, Conn., assignor, by mesne assignments, to Universal Bearing Corporation, Fairfield, Conn., a corporation of Delaware
Filed June 16, 1959, Ser. No. 820,635
6 Claims. (Cl. 29—90)

My invention relates to apparatus for and a method of burnishing raceways of antifriction bearings, more particularly antifriction bearings consisting of two telescoped ring-like members with rolling elements between them. My objective is to provide for simple and speedy burnishing capable of burnishing over the entire area of the raceways and to whatever degree circumstances call for, no matter how exacting the requirements.

I accomplish this objective by providing apparatus for and a method of simultaneously applying a force of any desired magnitude against one of the members in a radial direction, applying force of any desired magnitude against one of the members in an axial direction, and rotating the members relative to each other.

Figure 1:
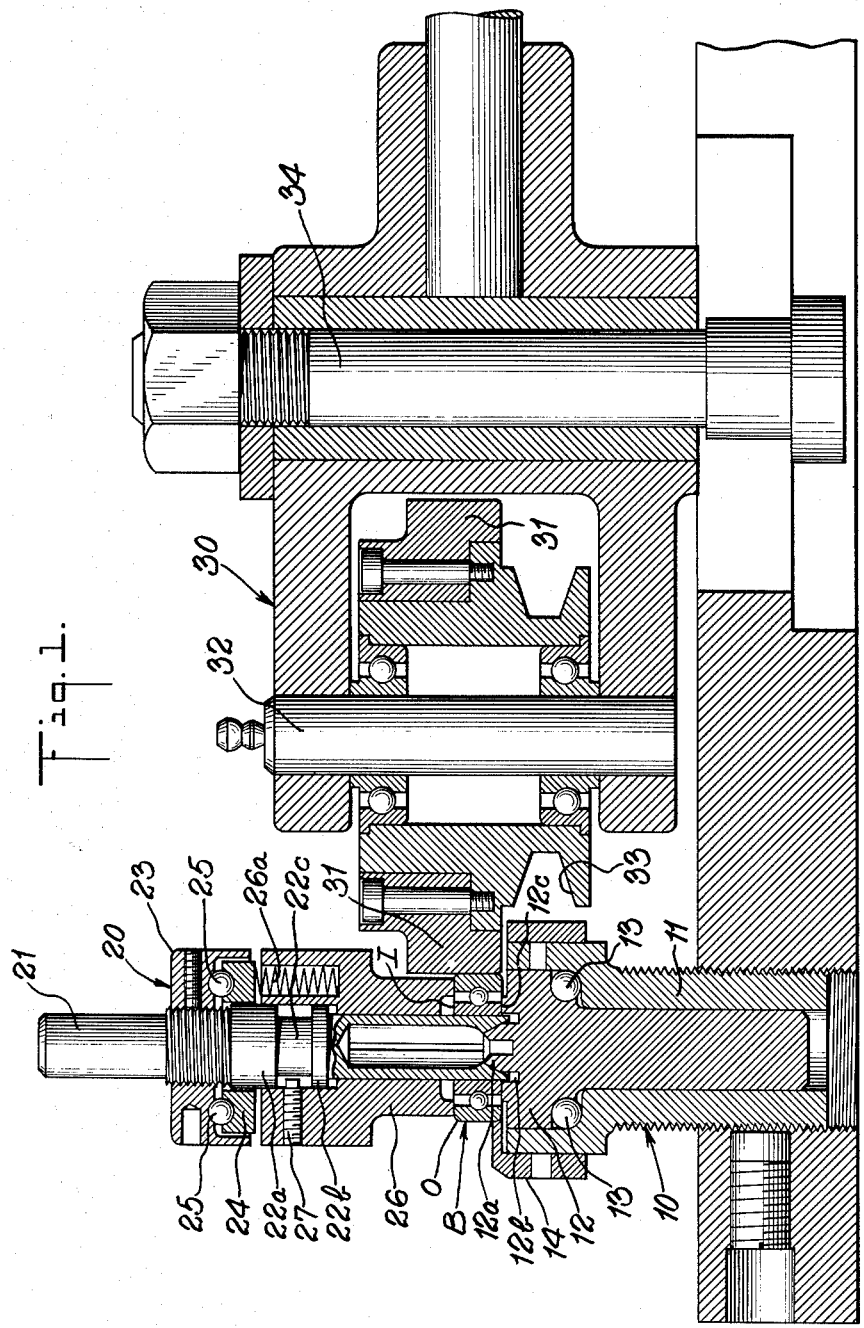
Figure 2:
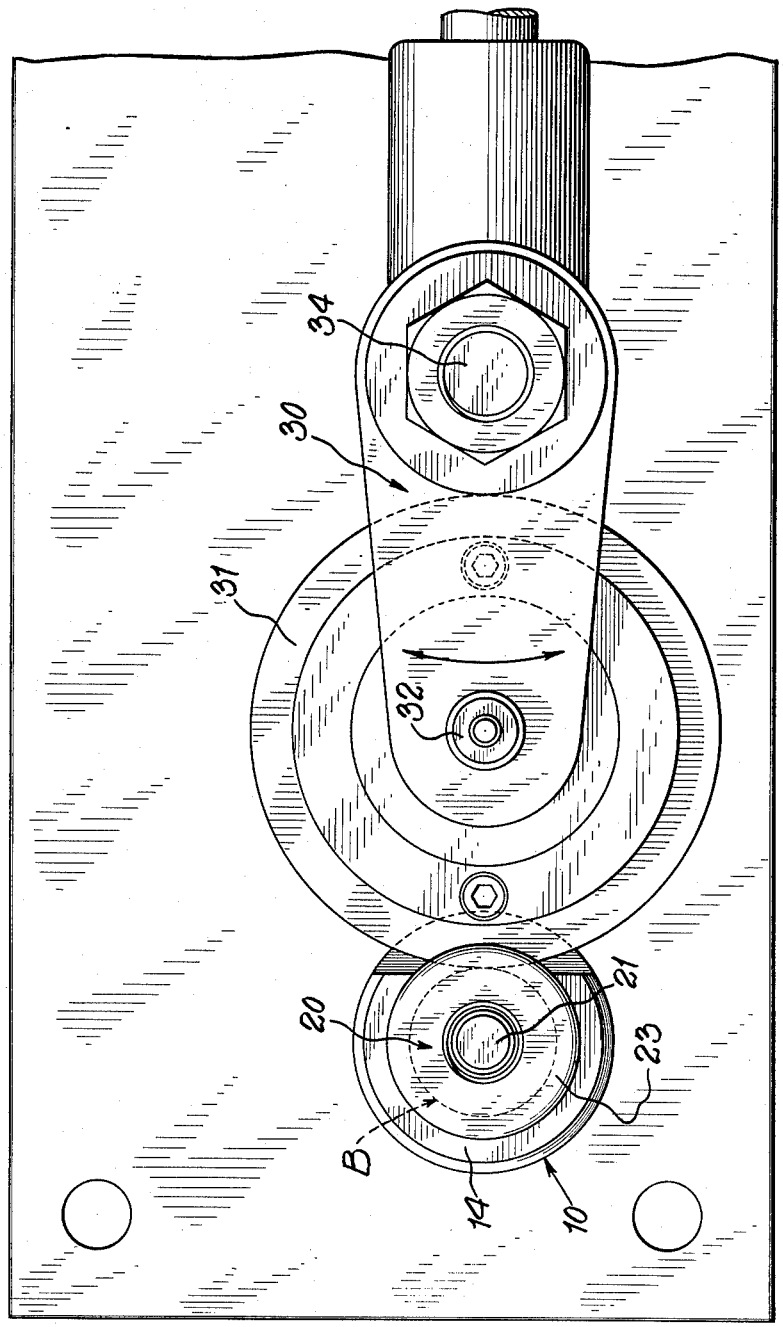

One embodiment of the invention is described below and shown in the accompanying drawings of which FIGURE 1 is a sectional view of the burnishing apparatus in operation, applying both axial and radial force to a bearing and FIG. 2 is a top view of the apparatus of FIG. 1. The principal parts of the apparatus are a support 10, an axial force part 20 and a radial force part 30. Resting on the support 10 is a bearing B consisting of an inner bearing member I, having a central longitudinal hole, an outer bearing member O, and rolling elements between the inner and outer members, in this case balls. The support 10 has a base 11 and a rotatable platform 12 resting on balls which in turn rest on the base 11. The platform has a raised tapered portion 12a surrounded by a moat-like depression 12b, which in turn is surrounded by a raised portion 12c, designed to support the inner member I without supporting the outer member O. The platform 12 has a guide 14 designed to assist the operator in finding the location on the platform 12 where the bearing B is to be placed.

The axial force part 20 is in a lowered position, as shown in FIG. 1, when the apparatus is in operation, and in a raised position when it is not in operation. It has a spindle 21 composed of cylindrical sections of varying diameter, including large diameter sections 22a and 22b and a small diameter section 22c. Secured to the spindle 21 is a flange 23. Surrounding the spindle 21 and rotatable about it is a ring 24, part of which is between the section 22a and the flange 23. Between the flange 23 and the ring 24 are balls 25. Below the ring 24 is a cylindrical member 26. The axial force of the part 20 is transmitted to the outer member O through this member 26, the force being transmitted to the member 26, from the ring 24 through a series of springs 26a evenly spaced around the periphery of the ring 24 and the member 26. Extending through the member 26 is a dog 27 which extends inward sufficiently to prevent the member 26 from moving axially with respect to the spindle 21 beyond the large diameter sections 22a and 22b, but not sufficiently to prevent rotation of the ring about the spindle. The lower end of the spindle 21 is split so that as the spindle is lowered through the central hole in the inner member I and over the tapered portion 12a of the platform 12, it is forced outward against the inner wall of the inner member I.

The radial force part 30 has a ring 31 rotatable about an axis at 32. The ring 31 is driven by a belt (not shown) mounted at 33. The part 30 is mounted so that it can pivot about an axis at 34, thereby allowing it to swing toward the support 10 and away from it. Stops may be provided to limit its swing in each direction, if desired.

When the apparatus is in operation the spindle 21 and the ring 31 both rotate clockwise. The operation starts with the axial force part 20 in a raised position and the radial force part 30 pivoted away from the support 10. A bearing B is placed on the platform 12 so that it rests on the raised platform 12c. The axial force part is lowered, automatically or manually, until the lower end of spindle 21 has passed through the central hold in the inner member I and has been forced against the inner wall of the inner member I, and the member 26 has been brought against the top of the outer member O. The force of the lower end of the spindle 21 against the inner wall of the inner member I is sufficient to cause the inner member I to rotate. The force of the member 26 against the top of the outer member O impels the surface of the shallow part of the top half of the raceway of the outer member O against the balls, which in turn are impelled against the shallow part of the bottom half of the raceway of the inner member I, so that these parts are burnished by the rotation of the inner member I.

At this point in the operation it is preferable, though not essential, to swing the radial part 30, automatically or manually, toward the support 10 until the ring 31 bears against the outer member O. The clockwise rotation of the ring 31 causes the outer member O to rotate counterclockwise, thereby increasing the burnishing effect. The force of the ring 31 against the outer member O can be varied, and as the force increases the balls are impelled against the deeper part of each raceway so that burnishing takes place throughout the entire top half of the raceway of the outer member and the entire bottom half of the raceway of the inner member. Both the axial force part 20 and the radial force 30 are then removed and the bearing B is inverted, whereupon the operation is repeated to burnish the part of the raceways remaining unburnished; i.e., what was the bottom half of the raceway of the outer member and the top half of the raceway of the inner member before the bearing was inverted.

From the foregoing description it should be clear that both the axial and radial force can be adjusted to any value from a maximum to zero. The axial force is adjustable by changing the position of the ring 23, thereby changing the compression of the springs 26a. The radial force is adjustable by varying the force with which the part 30 is brought against the outer member.

I claim:
1. Apparatus for burnishing antifriction bearings having telescoped outer and inner ring-like members with rolling elements between them, comprising a base, an axially moving force member mounted on the base and having as a part thereof means for abutting one of the members of the bearing and applying a selected axial force to it, means connected to the base to prevent the other bearing member from moving axially with the bearing member to which force is applied, a pivoting member mounted on the base, a roller rotatably mounted on the pivoting member and capable of abutting the outer member of the bearing in a line of contact and of applying radial rolling force to the outer member, and driving means mounted on the base for rotating one of the bearing members.

2. Apparatus for burnishing antifriction bearings having telescoped outer and inner ring-like members with rolling elements between them, comprising a base, an axially moving force member mounted on the base and having as a part thereof means for abutting one of the members of the bearing and applying a selected axial force to it, the axial force member being rotatable and driven by a motor, so that it rotates one of the bearing members, means connected to the base to prevent the other bearing member from moving axially with the bearing member to which force is applied, a roller rotatably mounted on the base and capable of abutting the outer member of the bearing in a line of contact and of applying radial rolling force to the outer member.

3. Apparatus for burnishing antifriction bearings having telescoped outer and inner ring-like members with rolling elements between them, comprising a base, a rotatable and axially moving force member mounted on the base and having as a part thereof means adapted for abutting the inner bearing member and applying a selected axial force to it, a first motor to rotate the axial force member, means connected to the base to prevent the outer bearing member from moving axially with the bearing to which the force is applied, a roller rotatably mounted on the base and capable of abutting the outer member of the bearing in a line of contact and of applying radial rolling force to the outer member, and a second motor to rotate the roller in the direction opposite to the direction of he rotation of the axial force member.

4. Apparatus for burnishing antifriction bearings having telescoped outer and inner ring-like members with rolling elements between them with the inner member of the bearing having a central hole, comprising a base, an axially moving force member mounted on the base and having as a part thereof means for abutting one of the members of the bearing and applying a selected axial force to it, an expansible chuck as a part of the axial force member and capable of being axially moved into the hole of the inner member, means connected to the base to prevent the other bearing member from moving axially with the bearing member to which force is applied, a roller rotatably mounted on the base and capable of abutting the outer member of the bearing in a line of contact and of applying radial rolling force to the outer member, and driving means mounted on the base for rotating one of the bearing members.

5. Apparatus as set forth in claim 1 wherein the axial force member includes means to adjust its axial force.

6. Apparatus as set forth in claim 5 wherein the adjustment means includes a spring.

References Cited in the file of this patent

UNITED STATES PATENTS

| | | |
|---|---|---|
| 1,437,833 | Buckwalter | Dec. 5, 1922 |
| 1,441,893 | Tinken | Jan. 9, 1923 |
| 1,708,491 | Alden | Apr. 9, 1929 |
| 1,722,494 | Brunner | July 30, 1929 |
| 2,541,455 | Anderson | Feb. 13, 1951 |
| 2,913,810 | Heim | Nov. 24, 1959 |
| 2,986,802 | Spence | June 6, 1961 |
| 2,998,636 | Spence | Sept. 5, 1961 |

FOREIGN PATENTS

| | | |
|---|---|---|
| 591,146 | Germany | Jan. 17, 1934 |
| 682,367 | Germany | Oct. 13, 1939 |
| 692,468 | Germany | June 20, 1940 |
| 952,954 | Germany | Nov. 22, 1956 |